United States Patent [19]

Oikawa et al.

[11] Patent Number: 5,228,423

[45] Date of Patent: Jul. 20, 1993

[54] DUAL-FUEL ENGINE

[75] Inventors: Toshihiro Oikawa; Shunichi Tsuzuki; Yuji Yamamoto, all of Saitama, Japan

[73] Assignee: Honda Giken Kogyo Kabushiki Kaisha, Tokyo, Japan

[21] Appl. No.: 960,162

[22] Filed: Oct. 13, 1992

[30] Foreign Application Priority Data

Oct. 12, 1991 [JP] Japan .................. 3-292087
Oct. 12, 1991 [JP] Japan .................. 3-292088

[51] Int. Cl.$^5$ .................................. F02M 21/02
[52] U.S. Cl. .................................. 123/525; 123/575; 123/432
[58] Field of Search ........ 123/575, 525, 432, DIG. 12, 123/3, 527

[56] References Cited

U.S. PATENT DOCUMENTS

| | | | |
|---|---|---|---|
| 3,364,911 | 1/1968 | Baudry et al. | 123/432 |
| 3,918,419 | 11/1975 | Dolza, Sr. | 123/432 |
| 4,275,698 | 6/1981 | Dennetiere | 123/432 |
| 4,476,827 | 10/1984 | Basaglia et al. | 123/525 |
| 4,479,466 | 10/1984 | Greenway et al. | 123/525 |
| 4,489,699 | 12/1984 | Pochlman | 123/525 |
| 4,635,609 | 1/1987 | Seppen et al. | 123/527 |
| 5,178,119 | 1/1993 | Gale | 123/DIG. 12 |

FOREIGN PATENT DOCUMENTS

| | | | |
|---|---|---|---|
| 58-77152 | 5/1983 | Japan | 123/527 |
| 59-5851 | 1/1984 | Japan | 123/575 |
| 62-214238 | 1/1987 | Japan | |
| 8301486 | 4/1983 | World Int. Prop. O. | 123/575 |

Primary Examiner—Willis R. Wolfe
Assistant Examiner—Erick Solis
Attorney, Agent, or Firm—Nikaido Marmelstein Murray & Oram

[57] ABSTRACT

In a dual-fuel internal combustion engine which can selectively use gaseous fuel such as CNG or liquid fuel such as gasoline, a pair of intake passages are independently connected to a combustion chamber of the engine, and a gaseous fuel supply device and a liquid fuel supply device are provided in the corresponding intake passages so that the liquid and gaseous fuels may not mix with each other when the fuel for the engine is switched over one from the other as they are introduced into the combustion chamber through different intake passages. Further, by switching the operating mode of the intake valve when changing the fuel, the configuration of the intake passage can be optimized for each fuel, and the timing and the lift of the intake valves may also be optimized for each fuel without complicating the control structure of the overall system. The present invention can improve the torque output and the emission property of the dual-fuel engine.

9 Claims, 5 Drawing Sheets

DUAL-FUEL ENGINE

TECHNICAL FIELD

The present invention relates to a dual-fuel internal combustion engine which can selectively use either liquid fuel such as gasoline or gaseous fuel such as compressed natural gas (CNG), in particular to such a dual-fuel internal combustion engine having various favorable features for a fuel intake system and a valve actuating mechanism.

BACKGROUND OF THE INVENTION

Recently, natural gas has came to attract attention as a substitute energy source for gasoline because of increasing oil prices and mounting environmental problems. Accordingly, using natural gas for the fuel of the internal combustion engines for motor vehicles is eagerly proposed. Natural gas is normally stored in a bottle mounted in a vehicle as compressed natural gas (hereinafter referred to as CNG). However, CNG is not readily available because the number of CNG gas stations is so limited. Therefore, a dual-fuel internal combustion engine which can selectively use either gasoline or CNG is proposed. According to the structure of the dual-fuel engine disclosed in Japanese patent laid open publication No. 62-214238, gasoline and CNG can be selectively used depending on the driving condition.

In conventional dual-fuel engines, a common intake passage and a common intake valve for both of the fuels are provided for each cylinder. And a gasoline injection system and a CNG injection system are provided in the common intake passage. The desirable combustion timing, and the desirable actuating timing and appropriate lift of the intake valves are different for each fuel. However, in reality, either the combustion condition is fixed to that for gasoline or some compromise is made by using a same set of conditions for gasoline and CNG.

In either case, when the fuel is switched from gasoline to CNG, the mixture of CNG and gasoline is supplied into the combustion chamber for a while because gasoline inevitably adheres around the intake valves. As a result, the combustion conditions sometimes deviate so much from the initially designed ones that emission properties are impaired, and the output torque is reduced.

BRIEF SUMMARY OF THE INVENTION

In view of such problems of the prior art, a primary object of the present invention is to improve a dual-fuel engine which can selectively use liquid fuel or gaseous fuel so that the engine output may be maximized under most conditions.

A second object of the present invention is to provide a dual-fuel engine which has an improved emission property.

A third object of the present invention is to provide a dual-fuel engine which favorably combines a variable valve actuating mechanism.

These and other objects of the present invention can be accomplished by providing a dual-fuel internal combustion engine which can selectively use gaseous fuel or liquid fuel, comprising: a combustion chamber defined in the engine; a pair of intake passages independently communicating with the combustion chamber; a gaseous fuel supply device provided in one of the intake passages; and a liquid fuel supply device provided in the other of the intake passages.

Thus, the liquid and gaseous fuels would not mix with each other as they are introduced into the combustion chamber through different intake passages, and the emission properties and the engine output may be optimized particularly when switching over the fuel. Further, by switching the operating mode of the intake valve when changing the fuel, the configuration of the intake passage can be optimized for each fuel, and the timing and the lift of the intake valves may also be optimized for each fuel without complicating the control structure of the overall system.

Typically, the liquid fuel consists of gasoline while the gaseous fuel consists of compressed natural gas, and the timing of opening the intake valves when the liquid fuel is used is more delayed than when the gaseous fuel is used.

According to a preferred embodiment of the present invention, the intake passages communicate with the combustion chamber via respective intake valves, and both of the intake valves are actuated when the liquid fuel is used but substantially only one of the intake valves is actuated when the gaseous fuel is used. Further, the gaseous fuel is used when the engine is in a low speed range, and the liquid fuel is used when the engine is in a high speed range so that improved emission property and high engine output may be combined in a favorable fashion. Thus, the advantages of a variable valve actuating system can be obtained in addition to the advantages of a dual-fuel engine without complicating the overall structure.

Preferably, a downstream end of a throttle valve is bifurcated into the pair of intake passages, and the gaseous fuel supply device is provided in the one of the intake passages immediately downstream of a point where the intake passages bifurcate while the liquid fuel supply device is provided in the other intake passage adjacent each intake port of the engine.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
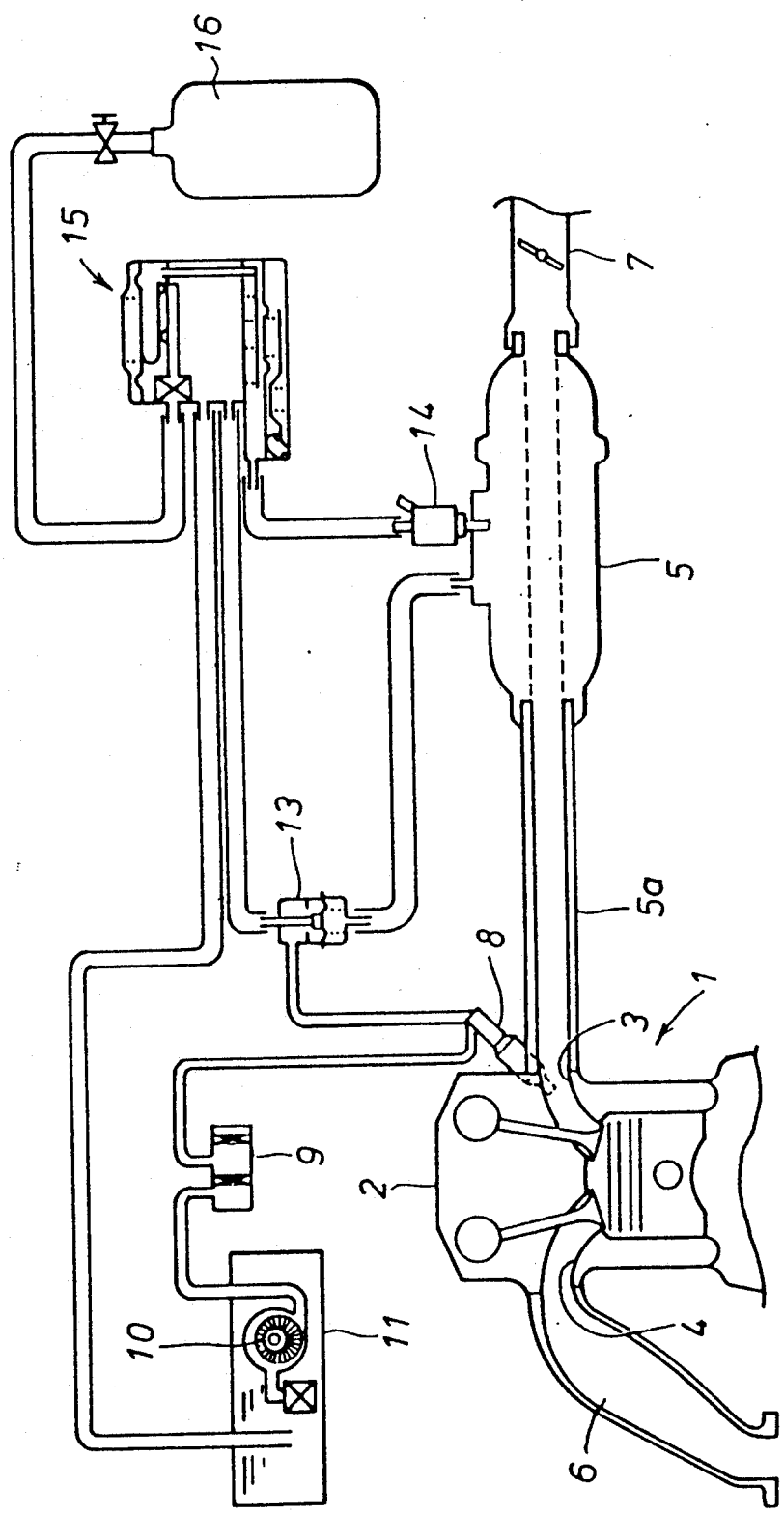
FIG. 1 is a diagram showing the overall structure of the dual-fuel engine according to the present invention.
Figure 2:
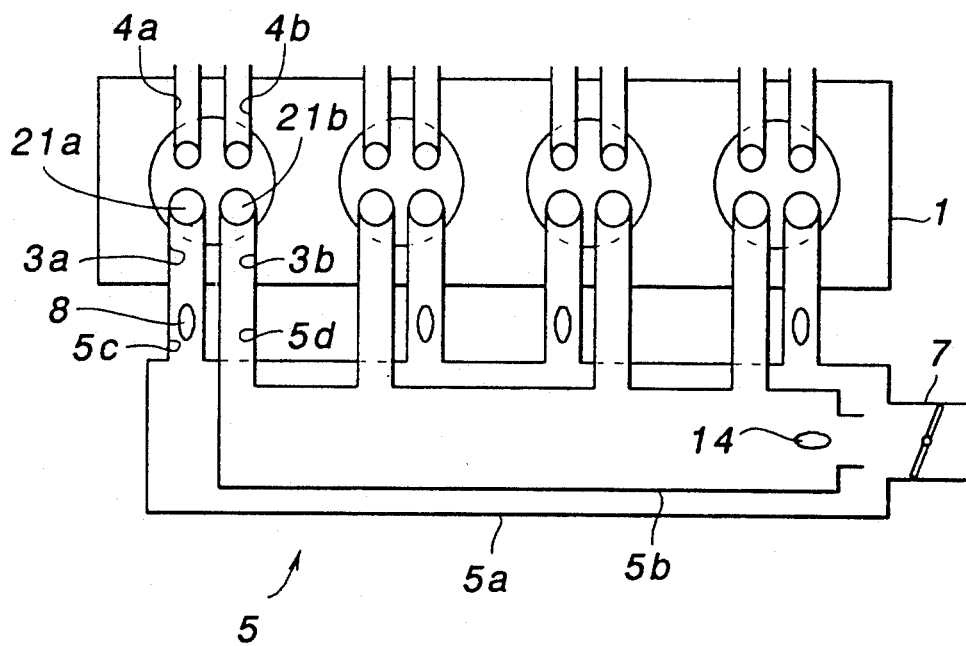
FIG. 2 is a diagram showing the structure of the fuel supply system and intake passage of the dual-fuel engine according to the present invention.

FIGS. 1 and 2 show a four-cylinder four-valve dual-fuel internal combustion engine 1 according to the present invention. A cylinder head 2 of this engine is provided with a pair of intake ports 3a and 3b communicated with a combustion chamber for each cylinder. The intake ports 3a and 3b are provided with a pair of intake valves 21a and 21b, respectively. The cylinder head 2 is also provided with a pair of exhaust ports 4a and 4b communicated with each corresponding combustion chamber for each cylinder. The intake ports 3a and 3b are connected to an intake manifold 5, and the exhaust ports 4a and 4b are connected to an exhaust manifold 6. The intake manifold 5 is connected to a throttle body 7 at its upstream end. The throttle body 7 is communicated with the atmosphere at its upstream end via an air cleaner not shown in the drawings.

As shown in FIG. 2, the intake manifold 5 consists of two parts 5a and 5b which branch off, respectively, into a gasoline intake passage 5c and CNG intake passage 5d provided separately from each other for each cylinder, as seen from its upstream end. One of the intake valves 21a is connected to the gasoline intake passage 5c, and the other intake valve 21b is connected to the CNG intake passage 5d. A gasoline fuel injection system 8 associated with the intake port 3a is provided in the gasoline intake passage 5c of the intake manifold 5.

Referring to FIG. 1, the gasoline fuel injection system 8 is connected via a filter 9 to a fuel pump 10 provided in a gasoline tank 11 at its upstream end. The gasoline fuel injection system 8 is also connected via a regulator 13 to the gasoline tank 11 at its downstream end. According to this structure, the gasoline serving as liquid fuel for this engine and pumped from the gasoline tank 11 by the fuel pump 10 is supplied to the gasoline fuel injection system 8 via the filter 9, and the surplus gasoline is returned to the gasoline tank 11 via the regulator 13.

Meanwhile, a CNG fuel injection system 14 is provided in the intake manifold 5b for CNG or before the branching points to the cylinders. The CNG fuel injection system 14 is connected to a bottle 16 for storing CNG via a pressure reducing regulator 15 as pressure reducing device. Thus, CNG is supplied to the CNG fuel injection system 14 after its pressure is reduced by the pressure reducing regulator 15.

Figure 3:
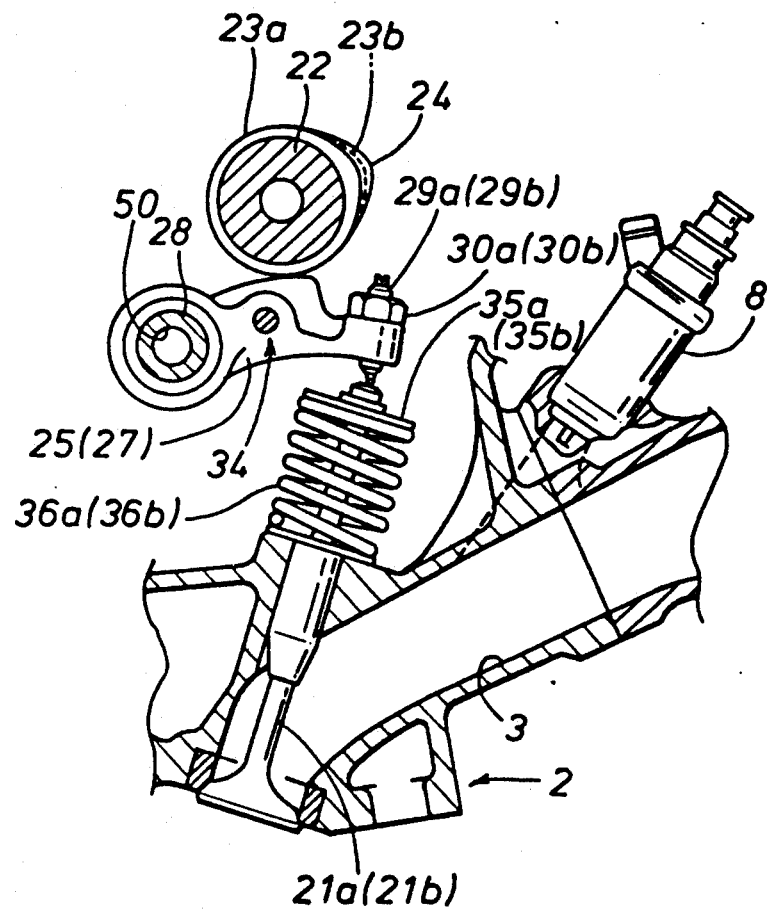
FIG. 3 is a fragmentary vertical sectional view of a part of the valve actuating system of the engine.
Figure 4:
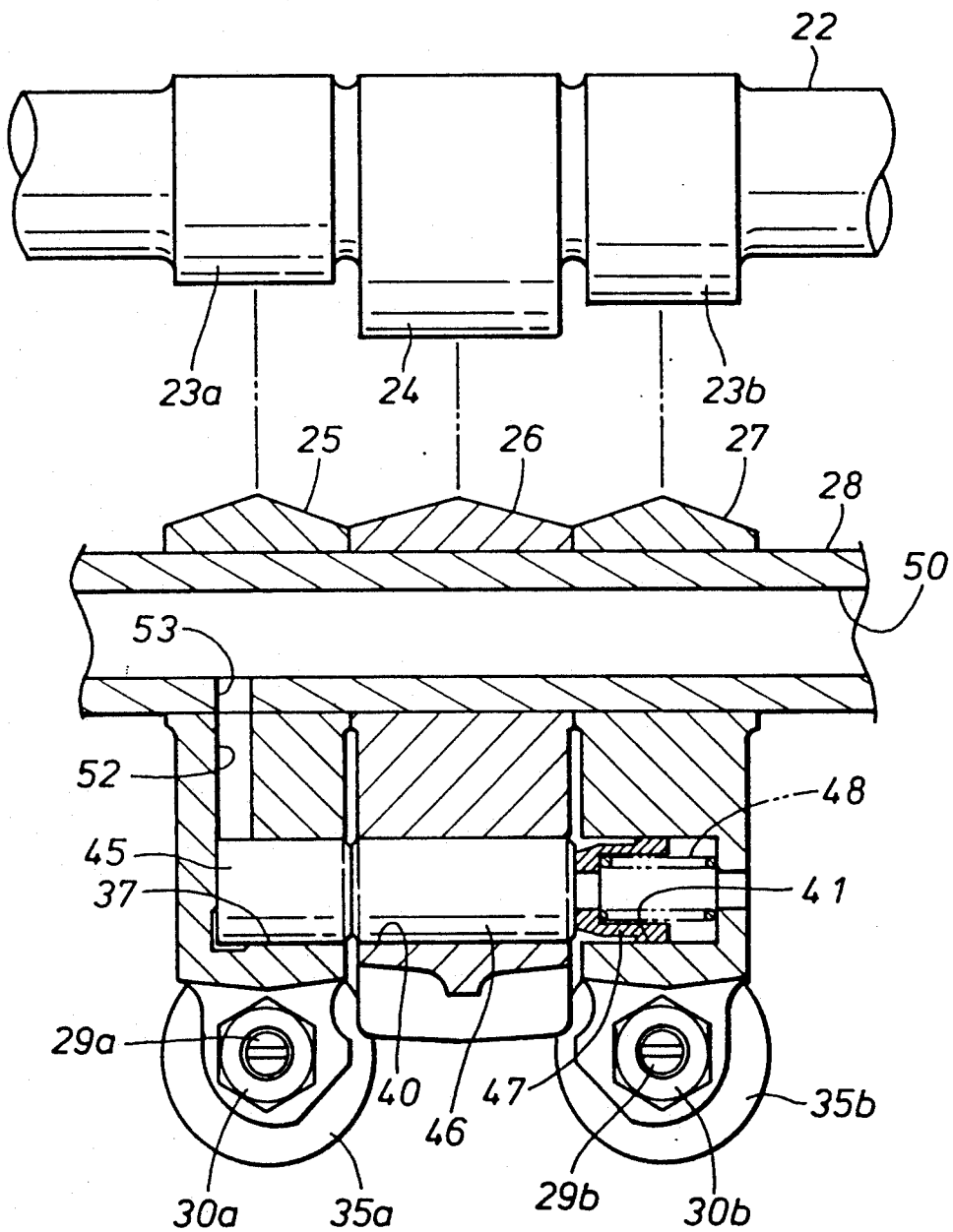
FIG. 4 is a fragmentary horizontal sectional view of a part of the valve actuating system of the engine.

FIGS. 3 and 4 show a part of the valve actuating mechanism of the engine 1. In addition to the intake valves 21a and 21b provided at the intake ports 3a and 3b, respectively, for each cylinder, the valve actuating mechanism further comprises a camshaft 22 which is provided with a small lift cam 23a, a CNG cam 23b and a gasoline cam 24 for each cylinder. The camshaft 22 rotates at half the speed of the crankshaft of the engine. Three rocker arms 25, 26 and 27 are pivotably supported by a rocker shaft 28 in parallel with each other. The cams 23a, 24 and 23b are adapted to engage with contact surfaces formed at intermediate portions of the rocker arms 25, 26 and 27, respectively. The free end of the rocker arm 25 located on the left hand side in FIG. 4 abuts the free end of the stem of the intake valve 21a via a tappet screw 29a secured by a lock nut 30a, and the free end of rocker arm 27 located on the right hand side in FIG. 4 likewise abuts the free end of the stem of the intake valve 21b via a tappet screw 29b secured by a lock nut 30b.

As well known in the art, the intake valve 21a is biased in the direction to close the valve by a valve spring 36a via a spring retainer 35a, and the intake valve 21b is also biased in the direction to close the valve by a valve spring 36b via a spring retainer 35b. The rotation of the camshaft 22 causes the intake valves 21a and 21b to close and open via the left rocker arm 25 and the right rocker arm 27, respectively. The central rocker arm 26 is actuated by the gasoline cam 24, and is constantly biased toward the gasoline cam 24 by a lifter spring not shown in the drawings.

The operation of a valve switching mechanism 34 employed for regulating the operation of the rocker arms 25 through 27 is now described in the following.

As shown in FIG. 4, the rocker arms 25, 26 and 27 are provided with lateral guide bores 37, 40 and 41 which are mutual aligned. The guide bore 37 of the rocker arm 25 located on the left hand side is closed at its left end, and receives a piston 45 therein. The closed end of the guide bore 37 is communicated with an oil supply passage 50 via a port 53 formed in the hollow rocker shaft 28 and a passage 52 passed lengthwise through the rocker arm 25. The guide bore 40 of the central rocker arm 26 extends laterally all the way therethrough, and likewise receives a piston 46 therein, the piston 46 having a substantially equal length as the guide bore 40. A cup-shaped stopper 47 is received in the guide bore 41 of the rocker arm 27 located on the right hand side. The stopper 47, which has a cylindrical shape and a bottom surface, is constantly biased toward the central rocker arm 26 by a compression coil spring 48 provided between an end of the guide bore 41 remote from the central rocker arm 26 and an end surface of the stopper 47 opposing the aforementioned end of the guide bore 41.

According to this valve switching mechanism 34, when the oil pressure in the oil supply passage 50 is low, each rocker arm 25, 26 and 27 is separately actuated by the corresponding cams 23a, 24 and 23b because the pistons 45, 46 and the stopper 47 are located in the corresponding guide bores 37, 40 and 41, respectively, under the biasing force of the compression coil spring 48 without any member extending across two adjacent rocker arms. Therefore, the central rocker arm 26 is actuated by the gasoline cam 24 but simply compresses the lifter repeatedly without affecting the operation of the valves 21a and 21b. Meanwhile, the left rocker arm 25 and the right rocker arm 27 are actuated by the small lift cam 23 and the CNG cam 23b engaging the contact surfaces of these rocker arms, respectively.

However, the lift of the intake valve 21a by the small lift cam 23a is extremely small as it is intended for the purpose of avoiding the mechanical seizure of the intake valve 21a which may be resulted by keeping it closed at high temperature for any extended time period. On the other hand, the intake valve 21b is allowed to open and close under the CNG mode.

When the oil pressure in the oil supply passage 50 is increased, the piston 45 is pushed partly into the guide bore 40, and the piston 46 is likewise partly pushed into the guide bore 41 of the rocker arm 27, against the biasing force of the compression coil spring 48. Therefore, the three rocker arms 25, 26 and 27 are integrally combined with each other. In this case, because the profile of the gasoline cam 24 is relatively larger than that of the CNG cam 23b, the rocker arms 25 and 27 are actuated to close and open the intake valves 21a and 21b under the gasoline mode determined by the profile of the gasoline cam 24.

The operation of the engine 1 according to the present invention is now described in the following with reference to FIGS. 2 through 5.

In low speed range of the engine 1 or in the speed range below N1 shown in FIG. 5, CNG is supplied to the engine 1 and the valve actuating mechanism is operated under the CNG mode. Under the CNG mode, the CNG injection system 14 supplies CNG to the engine but the gasoline injection system 8 is not operative and does not supply any gasoline to the engine with only the rocker arm 27 actuated by the CNG cam 23b so as to keep the intake valve 21a substantially closed and to open and close only the intake valve 21b. In this case, the opening timing of the intake valve 21b is more delayed than that under the gasoline mode.

Figure 5:
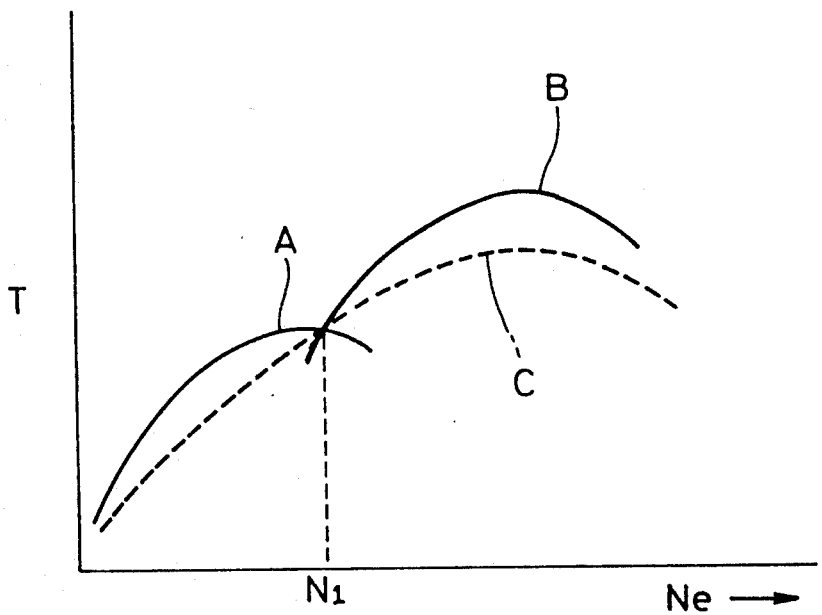
FIG. 5 is a graph showing the change in the torque output in relationship with the change in the rotational speed of the engine for the two different modes of the engine.

The torque output obtained under the CNG mode is indicated by the solid curve A in FIG. 5. The dotted curve C indicates the torque output obtained from a dual fuel engine having a single valve operating mode for the two fuels.

When the rotational speed is increased to N1 shown in FIG. 5, the fuel is switched from CNG to gasoline, and the valve actuating mechanism is also switched from the CNG mode to the gasoline mode. Under the gasoline mode, gasoline is supplied from the gasoline injection system 8, but no CNG is supplied from the CNG injection system 14. In this case, both the intake valves 21a and 21b are actuated by the gasoline cam 24 via the rocker arm 25 through 27 so as to open and close the two intake valves 21a and 21b under the gasoline mode. The opening timing of the intake valves 21a and 21b is more advanced than that under the CNG mode.

The solid curve B in FIG. 5 indicates the torque output under the gasoline mode. As can be readily understood from the curves A, B and C in FIG. 5, by appropriately selecting the rotational speed N1 for switching between the CNG and the gasoline modes or, more specifically, by setting the switching point at a point of rotational speed at which the torque outputs by the gasoline and the CNG modes coincide, it is possible to obtain a higher torque output than that obtained by the conventional dual-fuel engine over the entire speed range of the engine. Further, according to the present invention, by optimizing the configuration of the intake passage as well as the valve lift and timing for each of the fuels, the emission property of the engine can also be improved.

When the rotational speed of the engine 1 is reduced to N1 in FIG. 5, the valve actuating mechanism is returned to the CNG mode again. According to the above described embodiment, the emission property is even more improved because the gasoline adhering to the intake valve is prevented from being mixed into the CNG by using two separate intake passages for the gasoline and the CNG for each cylinder, or, more specifically, the intake passage provided with the CNG supply device is substantially blocked from the intake passage provided with the gasoline supply device under the CNG mode.

Although the present invention has been described in terms of a specific embodiment, it is possible to modify and alter details thereof without departing from the spirit of the present invention.

What we claim is:

1. A dual-fuel internal combustion engine which can selectively use gaseous fuel or liquid fuel, comprising:
   a combustion chamber defined in the engine;
   a pair of intake passages independently communicating with said combustion chamber;
   a gaseous fuel supply device provided in one of said intake passages; and
   a liquid fuel supply device provided in the other of said intake passages.

2. A dual-fuel engine according to claim 1, wherein said intake passages communicate with said combustion chamber via respective intake valves, said intake valves being actuated by a valve actuating mechanism which can actuate said intake valves in different modes depending on whether said gaseous fuel or said liquid fuel is used.

3. A dual-fuel engine according to claim 2, wherein said different modes provide different valve actuating timings for said intake valves.

4. A dual-fuel engine according to claim 3, wherein the timing of opening said intake valves when said gaseous fuel is used is more delayed than when said liquid fuel is used.

5. A dual-fuel engine according to claim 1, wherein said intake passages communicate with said combustion chamber via respective intake valves, and both of said intake valves are actuated when said liquid fuel is used but substantially only one of said intake valves is actuated when said gaseous fuel is used.

6. A dual-fuel engine according to claim 1, wherein said gaseous fuel is used when said engine is in a low speed range, and said liquid fuel is used when said engine is in a high speed range.

7. A dual-fuel engine according to claim 1, further comprising a throttle valve passage, a downstream end of said throttle valve passage being bifurcated into said pair of intake passages.

8. A dual-fuel engine according to claim 7, wherein said gaseous fuel supply device is provided in said one of said intake passages immediately downstream of a point where said intake passages bifurcate.

9. A dual-fuel engine according to claim 7, wherein said liquid fuel supply device is provided in said other intake passage adjacent each intake port of said engine.

* * * * *